UNITED STATES PATENT OFFICE.

ALBERT WILHELM REHNSTRÖM, OF MÄLHAMMAR, SWEDEN.

MANUFACTURE OF SOAP.

SPECIFICATION forming part of Letters Patent No. 476,556, dated June 7, 1892.

Application filed January 16, 1892. Serial No. 418,311. (No specimens.) Patented in Sweden November 28, 1889, No. 2,290; in England May 20, 1890, No. 7,854; in France September 15, 1890, No. 205,854, and in Canada May 9, 1891, No. 36,560.

*To all whom it may concern:*

Be it known that I, ALBERT WILHELM REHNSTRÖM, a subject of the King of Sweden and Norway, residing at Mälhammar, Rekarne, Sweden, have invented certain new and useful Improvements in the Manufacture of Soap, (patented in Sweden November 28, 1889, No. 2,290; in France September 15, 1890, No. 205,854; in England May 20, 1890, No. 7,854, and in Canada May 9, 1891, No. 36,560;) and I declare the following to be a full, clear, and exact description of the same.

With a knowledge of the properties which the salts of milk (milk-sugar and caseine substance) possess and which tend to make the human skin soft and smooth and also remove sunburn and allay irritations in the skin, I have in two pending United States applications, Serial No. 363,348, filed August 28, 1890, and Serial No. 418,312, filed January 16, 1892, set forth the mixing of a saponified soap mass with concentrated milk or concentrated whey, according as it is desired to produce a soap with more or less conspicuous properties of making the skin smooth and fair. In some cases it may, however, be desirable to mix with the soap mass both concentrated milk and concentrated whey, so as to still more vary the different kinds of such soap as may be found wanted or desired.

This invention relates, therefore, to the manufacture of a soap by adding to the already-saponified soap mass more or less concentrated milk and concentrated whey. The proportions of these respective compounds may evidently vary considerably. I have found that milk and whey in the proportion of twenty-five per cent. of weight of the soap mass will give good results. It is also evident, however, that this proportion may vary considerably. I may either use skimmed or unskimmed milk. The milk, with its natural constituents, is subjected to evaporation in the usual manner in vessels suitable for the purpose, and the evaporation is continued either to dryness, to the consistency of porridge, or up to different degrees between such consistency and dryness. This concentrated milk is then ready for mixing it in the separably-prepared soap mass. The whey intended to be used may consist of ordinary whey obtained from dairies conducting manufacture of cheese from unskimmed milk, skimmed milk, or of buttermilk. The whey may, if it is desired, be freed further from caseine remaining in the same. This whey contains thus the salts of the milk—that is to say, sugar of milk, phosphate of lime, magnesia, oxide of iron, chloride of potassium, chloride of sodium, and sodium oxide—together with some residue of caseine, fat, and albumen provided special steps have not been taken for removing the same. The whey is then concentrated in the manner above described in relation to the milk, either alone or together with the milk, until it reaches the consistency of porridge or to dryness, and is then ready to be mixed together with the concentrated milk in the previously-prepared soap mass. The saponification of the soap mass is produced in the usual manner by boiling some suitable fat with a sufficient quantity of alkali. As fat I may use cocoanut-oil, palm-oil, tallow, milk-fat, or other fats suitable for the preparation of soap, and as an alkali soda or potash lye may conveniently be used. Soda-lye is used if the production of solid soap is desired, and potash lye is used if a soft or liquid soap is to be produced. The soap mass is prepared by saponifying the fat with the alkali in the manner universally known and in the proportions customary for the saponification—as, for instance, twenty-two per cent. of cocoanut-oil, 4.5 per cent. caustic soda, and 73.5 per cent. water. As the milk intended to be added to the soap mass contains fat in a greater or smaller degree, an excess of alkali ought to be left in the soap mass, which excess of alkali can saponify this fat. The milk soap is then produced in the following manner: When the soap mass has been boiled and preferably completely saponified, as above described, and after the removal of the sub-lye, a mixture of concentrated milk and whey is added under constant stirring. The concentrated milk added can conveniently be twenty-five per cent. of the weight of the soap mass; but it is evident that these proportions may essentially vary. When the stirring has been continued until a homogeneous mass has been obtained, the latter is left to cool and is then worked between rollers or other suitable apparatus until a perfectly-uniform soap mass has been obtained. Some coloring-matter and perfume, or either, if wanted, are mixed into the mass when working it. When the soap mass has cooled and the desired consistency has been obtained, the same is pressed into molds in the usual manner. If the soap mass is liquid, the addition of the concentrated milk takes place by stirring the mass until the whole has become homogeneous. The mixture of the concentrated milk and whey with the soap mass can also take place after the ready-boiled soap mass has cooled, and is then affected in such a way that the cooled soap mass is broken and either not at all heated or heated to a rather low degree, and after the mixing of the milk the mass is treated in the manner set forth heretofore between rollers for obtaining a homogeneous mass. After being worked between the rollers the mass is treated in the way customary in the preparation of soap for molding the same.

It is evident that the relative proportions between the soap mass and the concentrated milk can be varied without departing from this invention, wherefore the latter is not to be considered as restricted to particular proportions.

What I claim is—

1. The herein-described process of making soap, consisting in adding concentrated milk and whey to a previously-saponified soap mass, substantially as set forth.

2. A soap containing a mixture of concentrated milk and whey, substantially as set forth.

In witness whereof I have hereunto signed my name in the presence of two subscribing witnesses.

ALBERT WILHELM REHNSTRÖM.

Witnesses:
ERNST SVANQVIST.
E. HERMANSSON.